(12) United States Patent
Kobayashi

(10) Patent No.: US 7,193,945 B2
(45) Date of Patent: Mar. 20, 2007

(54) METHOD FOR DETERMINING TYPE OF RECORDING MEDIA

(75) Inventor: Toshikazu Kobayashi, Tokyo (JP)

(73) Assignee: Sony Computer Entertainment Inc., Tokyo (JP)

(*) Notice: Subject to any disclaimer, the term of this patent is extended or adjusted under 35 U.S.C. 154(b) by 570 days.

(21) Appl. No.: 10/273,383

(22) Filed: Oct. 17, 2002

(65) Prior Publication Data

US 2003/0086347 A1 May 8, 2003

(30) Foreign Application Priority Data

Oct. 19, 2001 (JP) .............................. 2001-322907

(51) Int. Cl.
G11B 7/085 (2006.01)

(52) U.S. Cl. .............................. 369/53.37; 369/53.23; 369/44.27

(58) Field of Classification Search ................ None
See application file for complete search history.

(56) References Cited

U.S. PATENT DOCUMENTS

| | | | |
|---|---|---|---|
| 6,005,832 A * | 12/1999 | Kumagai | 369/44.27 |
| 6,011,762 A * | 1/2000 | Watanabe et al. | 369/44.27 |
| 6,058,082 A * | 5/2000 | Hwang | 369/44.27 |
| 6,229,772 B1 | 5/2001 | Kumagai et al. | |
| 6,243,341 B1 | 6/2001 | Hasimoto | |
| 6,252,834 B1 | 6/2001 | Kumagai | |
| 6,278,672 B1 | 8/2001 | Kobayashi | |
| 6,822,936 B2 * | 11/2004 | Ono et al. | 369/53.23 |
| 2001/0024408 A1 | 9/2001 | Kobayashi | |

FOREIGN PATENT DOCUMENTS

| | | |
|---|---|---|
| JP | 62-031031 | 2/1987 |
| JP | 04-123321 | 4/1992 |
| JP | 05-054396 | 3/1993 |
| JP | 09-259435 | 10/1997 |
| JP | 10-312629 | 11/1998 |
| JP | 11-288550 | 10/1999 |
| JP | 11-353787 | 12/1999 |
| JP | 2000-228049 | 8/2000 |

OTHER PUBLICATIONS

"Detection of Optical Disk Type" IBM Technical Disclosure Bulletin, vol. 29, No. 3; pp. 995-996 Aug. 1986; IBM Corp.
Supplementary European Search Report dated Nov. 22, 2006 for corresponding European Application EP 02 80 2016.

* cited by examiner

Primary Examiner—Andrea Wellington
Assistant Examiner—Michael V. Battaglia
(74) Attorney, Agent, or Firm—Katten Muchin Rosenman LLP

(57) ABSTRACT

An objective lens of an optical pick-up is ascended from the disc Far position towards the disc Near position at a constant velocity, and a peak bottom detector detects levels between the peak to the bottom (peak-to-bottom levels) of focus error signals obtained during the focus movement. A servo processing microcomputer counts the number of focus error signals having a peak-to-bottom level not smaller than the predetermined minimum level, out of all peak-to-bottom levels obtained during the focus movement across the recording layer of a disc, and defines the count value as the number of the recording layers of the disc. This allows correct determination of the number of recording layers of recording medium while not being affected by variation in property of the instruments, variation in reflectivity of recording medium, variation in the ambient temperature and fake pulse corresponded to waviness in focus error signal.

14 Claims, 15 Drawing Sheets

FIG. 16

| FINAL DETERMINATION | RESULT | DETERMINATION | NEXT ACTION |
|---|---|---|---|
| DETERMINATION A | LO LEVEL, L1 LEVEL < MIN LEVEL | BOTH OF LO LEVEL AND L1 LEVEL DETERMINED AS FAKE SIGNALS (WAVINESS) | RETURN TO LO LEVEL MEASUREMENT |
| DETERMINATION B | L1 LEVEL/LO LEVEL > K, AND L1 LEVEL > MIN LEVEL | LO LEVEL IN THE FORMER STAGE DETERMINED AS FAKE SIGNAL | RETURN TO L1 LEVEL MEASUREMENT AFTER SUBSTITUTING L1 LEVEL FOR LO LEVEL |
| DETERMINATION C | LO LEVEL/L1 LEVEL > K, AND LO LEVEL > MIN LEVEL, AND COUNT-DOWN IN PROGRESS | L1 LEVEL IN THE LATTER STAGE DETERMINED AS FAKE SIGNAL | RETURN TO L1 LEVEL MEASUREMENT |
| DETERMINATION D | COUNT-DOWN COMPLETED BEFORE L1 LEVEL MEASUREMENT, AND LO LEVEL > MIN LEVEL | DETERMINED AS SINGLE-LAYERED BASED ON ABSENCE OF L1 LEVEL ON THE LATTER STAGE | DETERMINATION COMPLETED |
| DETERMINATION E | L1 LEVEL/LO LEVEL < K, AND LO LEVEL, L1 LEVEL > MIN LEVEL | DETERMINED AS DUAL-LAYERED BASED ON DETECTION SUGGESTING SIGNAL PLANES TWICE | DETERMINATION COMPLETED |

METHOD FOR DETERMINING TYPE OF RECORDING MEDIA

This application is related to Japanese Patent Application No. 2001-322907 filed on Oct. 19, 2001, based on which this application claims priority under the Paris Convention and the contents of which are incorporated herein by reference.

BACKGROUND OF THE INVENTION

1. Field of the Invention

The present invention relates to a device for determining type of recording media, a method for determining type of recording media, a computer-readable recording medium having recorded therein a program to be executed by a computer for determining type of recording media, and a program to be executed by a computer for determining type of recording media, all of which are appropriately applicable to video game console, DVD device, magneto-optical disc device, and magnetic disc device.

2. Description of the Related Art

There is a conventionally known recording medium with two-dimensional structure where recording layer is "single-layer", such as CD-ROM or so forth Further, there is a known recording medium (three-dimensional recording medium) with three-dimensional structure of "multi-layer" where a plurality of recording layers are laminated, such as DVD, FMD (Fluorencent Multi-layer Disc) or so forth, besides the recording medium with two-dimensional structure of "single-layer."

Device for handling such three-dimensional recording medium must be compatible both for single-layer recording medium having a single recording layer and multi-layer recording medium having two or more recording layers. Such device aimed at handling both of the single-layer and multi-layer recording media should, however, alter settings of laser level or gain of the individual signals between the both.

So that it is a general practice for the device for handling the three-dimensional recording medium to determine whether a recording medium is of single-layer or multi-layer, and alter settings for various portions based on the determined is result to thereby effect recording and reproduction to or from such recording medium.

In a typical case of a DVD device for handling multi-layer DVDs, an optical pick-up makes a gradual approach from a predetermined position towards a DVD so as to generate reproduction signals (sum signals=RF signals), and based on differences in the level of which, whether the disc is of single-layer or multi-layer, or whether the disc is of phase change type such as DVD-RW (level determination method) is determined; or the optical pick-up makes a gradual approach from a predetermined position towards a DVD so as to generate focus error signals (FE signals), and based on count of the number of errors in such FE signal, whether the disc is of single-layer or multi-layer is determined (focus error counting method).

More specifically, in the level determination method, making a gradual approach of an optical pick-up from a predetermined position towards a DVD (for example, making a gradual approach of an optical pick-up from a position distant from a disc (Disc Far) towards a position close thereto (Disc Near)), while keeping the laser level thereof constant, can first generate a reproduction signal (disc surface reflection signal) ascribable to the light reflected on a protective film of the disc typically made from polycarbonate, and can then generate a reproduction signal (signal plane reflection signal) ascribable to the light reflected on a recording layer (signal plane) of the disc.

FIG. 1 shows a disc surface reflection signal and a signal plane reflection signal of a DVD having a single recording layer (referred to as a single-layer DVD, hereinafter). FIG. 2 shows a disc surface reflection signal and a signal plane reflection signal of a DVD having two or more recording layers (referred to as a multi-layer DVD, hereinafter).

As is clear from comparison between FIGS. 1 and 2, there is no difference in the level of disc surface reflection signal between the single-layer (FIG. 1) and multi-layer (FIG. 2) discs on the other hand, the signal plane reflection signal appears as a single peak which is ascribable to the single recording plane for the single-layer DVD and has a larger level P1 , but appears as a peak having a plurality of maximum points corresponded to a plurality of recording planes for the multi-layer DVD (two maximum points corresponded to two recording layers for the case shown in FIG. 2), and having a level P2 lower than that of the single-layer DVD (P1>P2) which is attributable to difference in transmittivity of light of the individual layers, or to random scattering of light by gap between the adjacent layers.

Thus the level determination method conveniently sets a threshold value at an intermittent level between the peak levels obtained for the single-layer DVD and multi-layer DVD, and a DVD is determined as a single-layer one if the level of the signal plane reflection signal thereof is not less than the threshold value, but as a multi-layer DVD or low reflection recording medium (for example, phase-change-type disc) if the level of the signal plane reflection signal thereof is less than the threshold value. This successfully allows determination of recording medium whether it is of single-layer, multi-layer or low reflection type.

On the contrary in the focus error counting method, making a gradual approach of the optical pick-up from a predetermined position towards the DVD, while keeping the laser level thereof constant, gives a focus error signal (FE) as shown in FIG. 3 immediately before and after the focal point on the recording plane for a single-layer DVD, but gives a focus error signal (FE) as shown in FIG. 4 immediately before and after the focal point on the recording plane for a multi-layer DVD.

Thus the focus error counting method conveniently sets a high-level threshold value (FcmpH Slice Level) for such focus error signal, and generates a high-level signal FcmpH during a period that the focus error signal exceeds such high-level threshold value.

Or the system conveniently sets a low-level threshold value (FcmpL Slice Level) for such focus error signal, and generates a FcmpL signal that becomes high-level during a period that the focus error signal becomes lower than such low-level threshold value.

As is clear from comparison of FcmpH signal and FcmpL signal shown in FIG. 3 with those shown in FIG. 4, the single-layer DVD gives only one pulse of the FcmpH signal or FcmpL signal as shown in FIG. 3, and on the contrary the multi-layer DVD gives a plurality of pulses of the FcmpH signal or FcmpL signal as shown in FIG. 4 (for the exemplary case shown in FIG. 4 gives two pulses of the FcmpH signal or FcmpL signal since the DVD has two recording layers).

Thus in the focus error counting method, the disc is determined as a single-layer DVD if the number of pulses is unity, and is determined as a multi-layer DVD if the number of pulses is two or more. This allows determination whether as the DVD has a single or plurality of recording layers However, the "level determination method" and "focus error counting method", both or which being conventional determination methods for single-layer disc and multi-layer disc, has suffered from problems below due to their large dependence on signal levels of the reproduction signal and focus error signal.

More specifically, although the "level determination method" is valuable for assessing various gain setting during recording/reproduction, problems of the method reside in that it requires optimum level setting of the threshold values for every instruments for a successful determination of single-layer and multi-layer discs, and in that it only has a narrow allowance for variation in reflectivity of the recording medium due to time-dependent degradation.

On the other hand, the "focus error counting method" suffers from difficulty in setting high-level threshold value (FcmpH Slice Level) or low-level threshold value (FcmpL Slice Level) to an optimum level, which has undesirably resulted in incorrect generation of pulses for the counting, and incorrect counting of the number of pulses due to fake pulse.

The focus error signal (FE) may sometimes have waviness immediately before and after the focal point as shown in FIGS. 3 and 4 depending on mode for detecting focus error, optical design of the optical pick-up, temperature change, signal gain and so forth. The waviness indicated by dotted line in FIGS. 3 and 4 will be causative of fake pulse, which otherwise should not appear, if the level thereof exceeds the high-level threshold value (FcmpH slice Level) or becomes lower than the low-level threshold value (FcmpL Slice Level).

Since the "focus error counting method" makes the single-layer/multi-layer determination by counting the number of pulses of the FcmpH signal or in the FcmpL signal, the fake pulse may give the count value for the FcmpH signal or FcmpL signal different from the true count value thereof, which obstructs correct single-layer/multi-layer determination.

In an exemplary case for the single-layer DVD shown in FIG. 3, the count value may be given as "2", which should be "1" in true, since also the take pulse indicated by the dotted line is included in the counting, so that the single-layer DVD may be misjudged as a multi-layer DVD

SUMMARY OF THE INVENTION

The present invention was proposed to address the foregoing problems, and an object thereof resides in that providing a single-layer/multi-layer determination method which is substitutable for the conventional "focus error counting method" and "level determination method", and is to provide a device for determining type of recording media, a method for determining type of recording media, a computer-readable recording medium having recorded thereon a program to be executed by a computer for determining type of recording media, and a program to be executed by a computer for determining type of recording media, all of which can correctly determine the number of recording layers while not being affected by variation in property of the instruments, variation in reflectivity of recording medium, variation in the ambient temperature and fake pulse corresponded to waviness in focus error signal.

The present invention conveniently sets a determination period which is defined as a period during which reproduction output corresponded to a recording layer, out of various reproduction outputs from a recording medium, is obtained, and detects a reproduction output level only within the determination period based on the amplitude of reproduction output corresponded to the recording layer.

Among reproduction outputs detected within the determination period, the number of those having reproduction output level larger than a predetermined level is detected, whereby a recording medium is determined as having recording layers in a number same as the number of the accepted reproduction outputs.

A storage device may store a predetermined normal ratio of a plurality of reproduction outputs at a normal level obtained from a recording medium having a plurality of recording layers. The recording medium providing at least a first reproduction output and a second reproduction output. The counter may divide the value of the second reproduction output by the value of the first reproduction output, compare the result of division with the normal ratio stored in the storage device, and, for the case the result of division is larger than the normal ratio, compare the level of the second reproduction output with the predetennined level.

The method may include storing a normal ratio of a plurality of reproduction outputs at a normal level obtained from a recording medium having a plurality of recording layers, and obtaining at least a first reproduction output and a second reproduction output from the recording medium. The method may also include dividing the value of the second reproduction output by the value of the first reproduction output, comparing the result of division with the normal ratio, and comparing the level of the second reproduction output with the predetermined level, for the case the result of division is larger than the normal ratio.

BRIEF DESCRIPTION OF DRAWINGS

The above and other features will be better understood from the exemplary embodiment described below, taken together with the drawings, of which:

FIG. 16 is a chart for explaining criteria for single-layer/multi-layer determination used in a video game console according to an embodiment.

DETAILED DESCRIPTION OF THE PREFERRED EMBODIMENTS

Preferred embodiments of the present invention are described in detail below, with references made to relevant accompanying drawings.

The present invention is applicable to a video game console for executing video game through reproducing video game program recorded in a recording medium, for which both of single-layer medium having a single recording layer and multi-layer medium having a plurality of recording layers are available.

As the single-layer medium, a CD, a DVD having one recording layer on one side only (single-layer DVD), and a DVD having one recording layer on each sided (each sided single-layer DVD) are included.

Further, as the multi-layer recording medium, a DVD having a plurality of recording layers on one sided only (one sided multi-layer DVD), a DVD having a plurality of recording layers on each sided (each sided multi-layer DVD), and a phase change disc (DVD-R, DVD-RW) are included.

Constitution of First Embodiment

Figure 5:
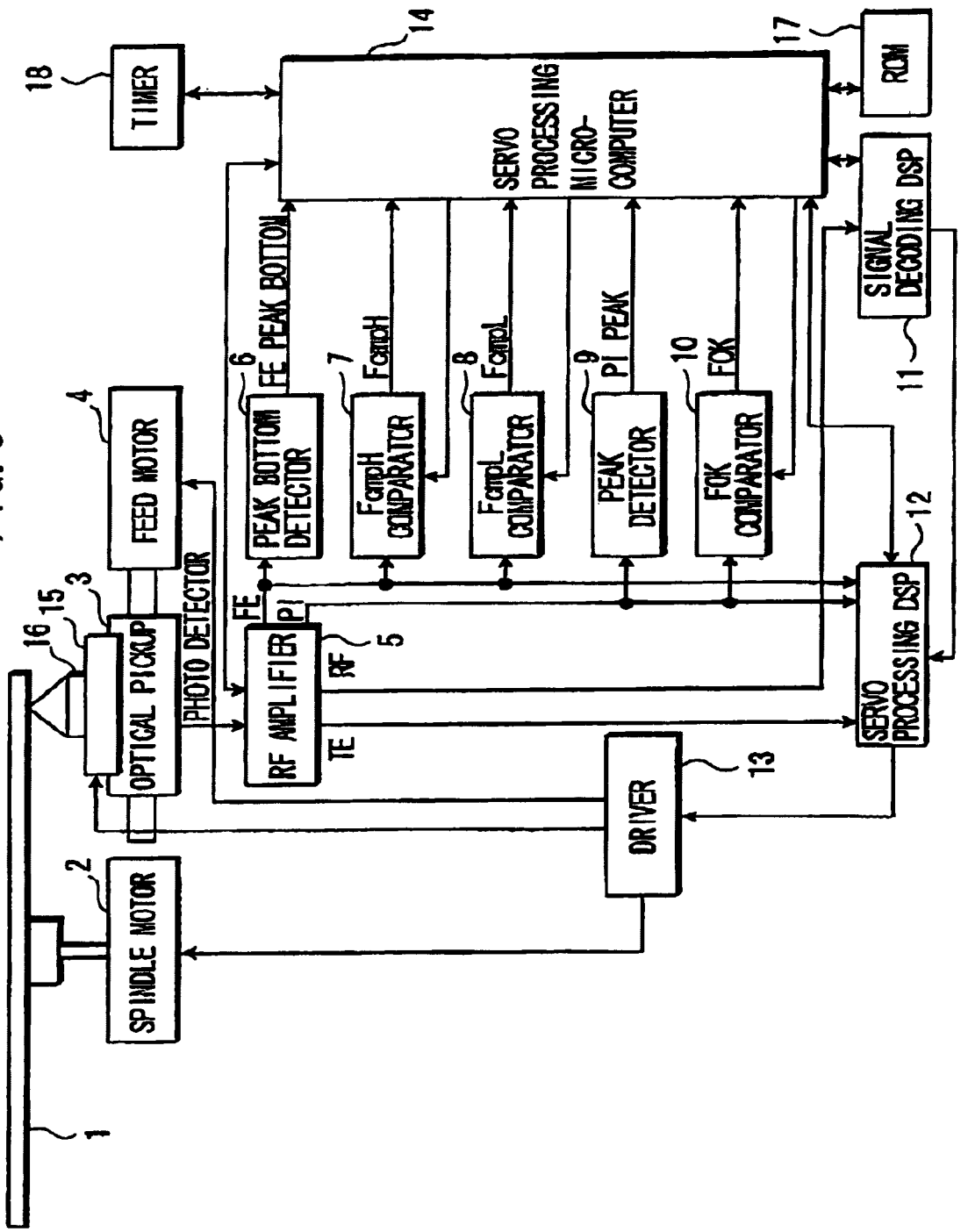
FIG. 5 is a block diagram of a video game console according to an embodiment to which the present invention is applied.

A video game console according to the first embodiment of the present invention has, besides functions for executing video games, a single-layer/multi-layer determination function for determining the number of recording layer of DVDs as shown in FIG. 5.

More specifically, in order to exhibit the single-layer/multi-layer determination function, the video game console of the embodiment has a spindle motor 2 for rotating a disc 1 at a constant angular velocity or at a constant linear velocity, and an optical pick-up 3 for irradiating laser beam to the disc 1 and for generating, based on reflection of such laser beam, photo-detector signals which include focus error signal, tracking error signal, RF signal (sum signal for signal decoding) and PI signal (a signal obtained by extracting a low-frequency component of the sum signal) for expressing reflectivity of the disc 1.

The video game console also has a feed motor 4 for moving and controlling the optical pick-up 3 along the radial direction of the disc 1, and an RF amplifier 5 for calculating and amplifying the photo-detector signals at a predetermined gain and for outputting the resultant signal.

The video game console still also has a FcmpH comparator 7 for generating FcmpH signal obtained by binary coding of the focus error signal based on a high-level threshold value set for such focus error signal fed via the RF amplifier 5; a FcmpL comparator 8 for generating FcmpL signal obtained by binary coding of the focus error signal based on a low-level threshold value set for such focus error signal fed via the RF amplifier 5; and a peak bottom detector 6 for detecting peak level and bottom level of the focus error signal fed via the RF amplifier 5 based on FcmpH signal and FcmpL signal generated by the comparators 7 and 8, respectively.

The video game console still also has a peak detector 9 for detecting peak level of the disc reflection signal (PI signal) which expresses reflectivity of the disc and is fed via the RF amplifier 5; an FOK comparator 10 for generating FOK signal by binary coding of the PI signal based on a predetermined threshold value; and a signal-decoding DSP 11 for deciding the RF signal fed via the RF amplifier 5.

The video game console still also has a servo processing DSF 12 for controlling rotation of the spindle motor 2 and feeding of the optical pick-up 3, which are effected through controlling a driver 13 based on the focus error signal, tracking error signal, RF signal, PI signal and so forth fed from the RF amplifier 5; and a servo processing microcomputer 14 responsible for setting the individual threshold values for the FcmpH comparator 7, FcmpL comparator 8 and FOK comparator 10, respectively.

The optical pick-up 3 has, besides the foregoing photo-detector, a biaxial actuator 15 and an objective lens 16.

Reproduction Process

Next paragraphs will describe an operation before information stored in the disc 1 is reproduced (reproduction process) on thus-composed video game console.

Figure 6:
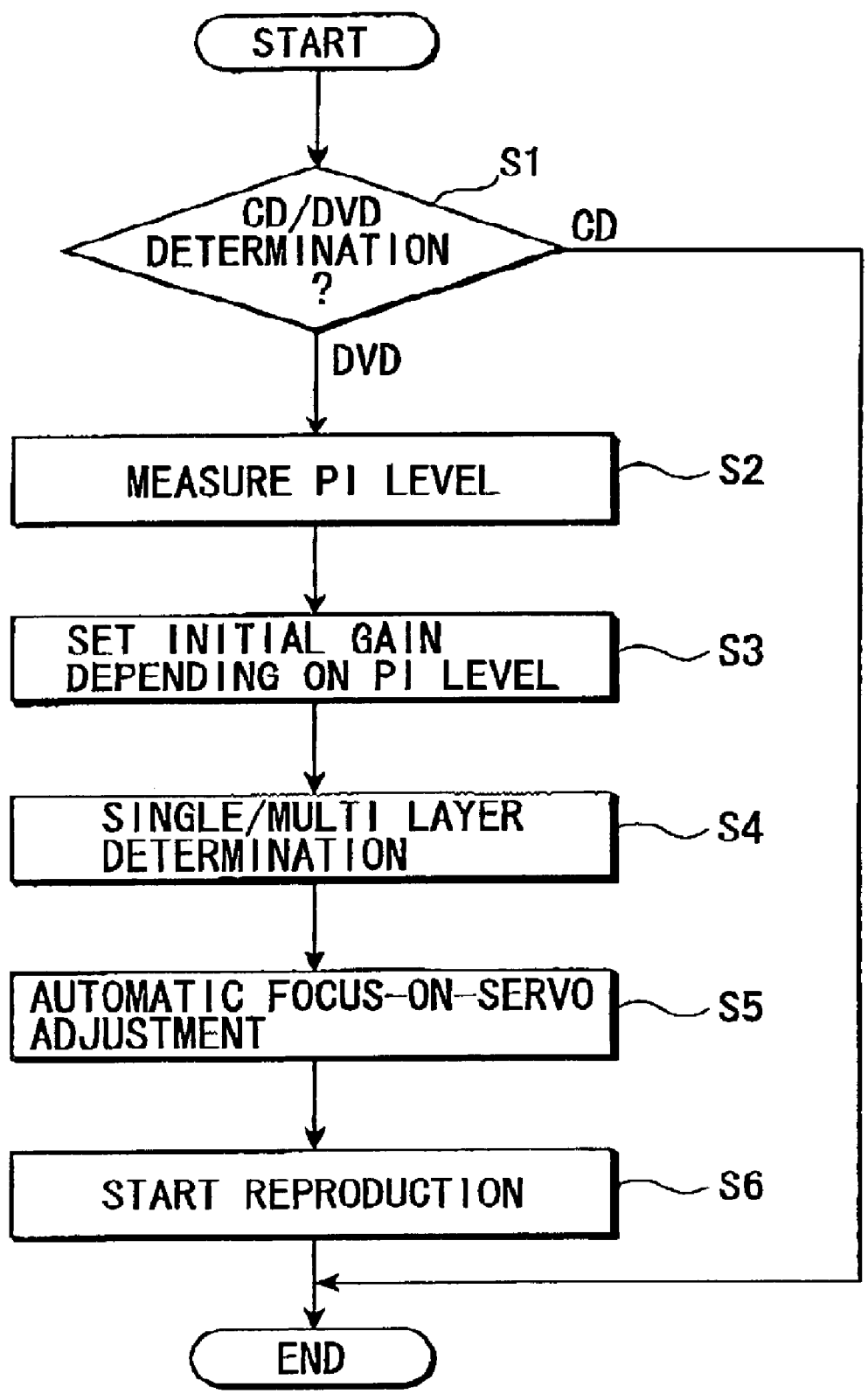
FIG. 6 is a flow chart for explaining reproduction process executed on a video game console according to an embodiment.

FIG. 6 is a flow chart showing a process flow of such reproduction process. A program for executing such reproduction process shown in this flow chart is preliminarily stored in a ROM 17 provided within a main body of the video game console, which is to be read out by the servo processing microcomputer 14 from the ROM 17 and to be executed under control.

Another possible way may be such that the program for executing the reproduction process is preliminarily stored in the disc 1, the servo processing microcomputer 14 reads the program out from the disc 1 and stores it under control in a storage section such as RAM, HDD or the like only for the first time, whereby regeneration of information stored in the disc 1 can be started for the next time or thereafter using such program for executing the regeneration process stored in the storage section.

Still another possible way may be such that the program for executing the regeneration process shown in the flow chart is downloaded from a server machine on a network such as the Internet into a storage section such as RAM, HDD or the like, and the execution program is read out from the storage section and executed under control by the servo processing microcomputer 14.

The regeneration process shown in the flow chart in FIG. 6 is activated when loading of the disc 1 is detected by the servo processing microcomputer 14 of the video game console, and the process step then advances to step S1.

In step S1, the servo processing microcomputer 14 determines whether the disc 1 loaded on the video game console is a CD or DVD.

More specifically, depth of the recording layer of CD from the disc surface thereof is larger than that of DVD, so that the servo processing microcomputer 14 makes the servo processing DSP 12 and the driver 13 control movement of focal point of the laser beam to be irradiated on the disc 1 so as to gradually approach the recording layer of the disc 1 from a position distant from such recording layer.

Figure 7:
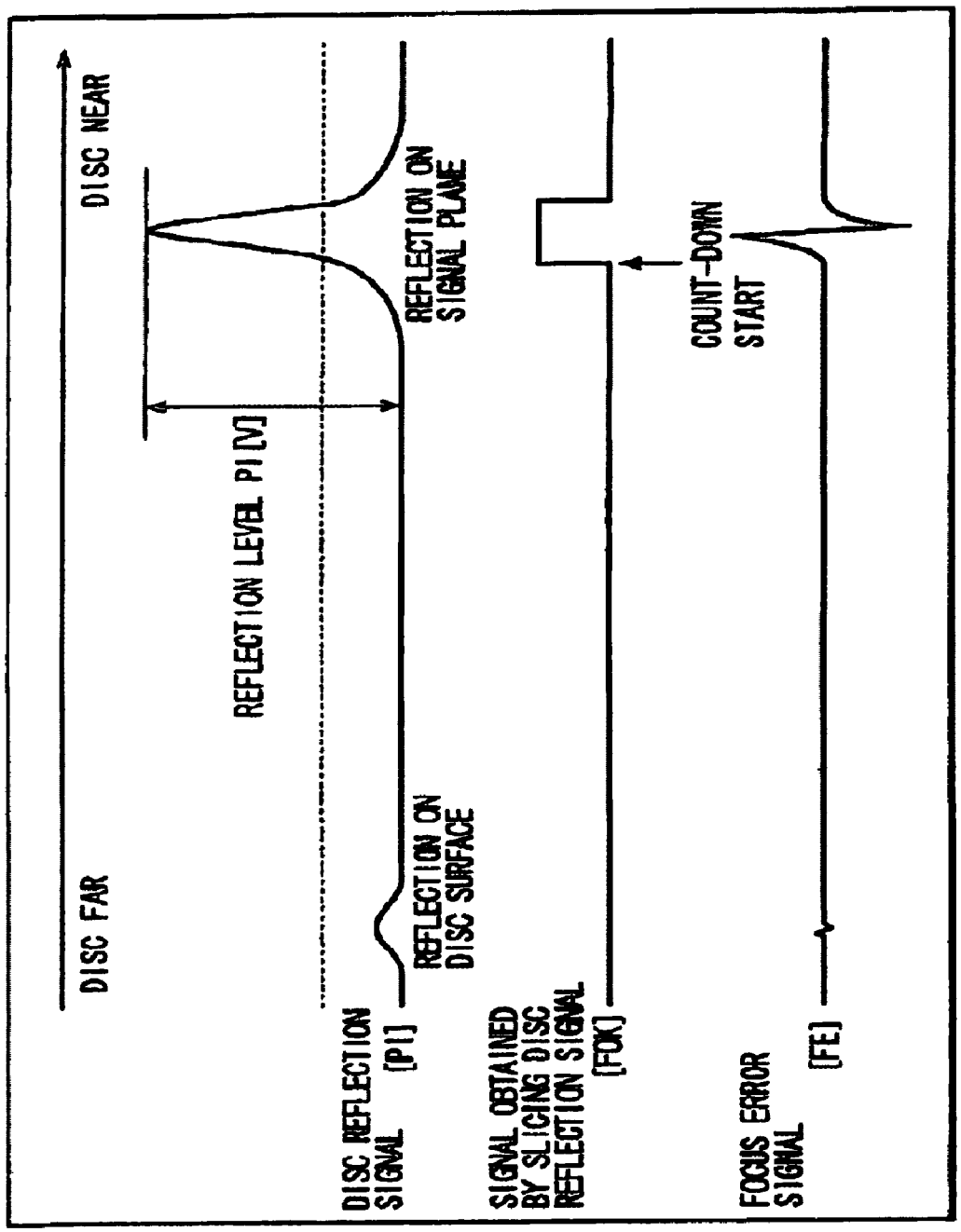
FIG. 7 is a chart showing reproduction outputs ascribable to disc surface and recording layer of a single-layer disc.

Corresponding to the movement under control, the optical pick-up 3 generates a disc reflection signal (PI signal) as shown in FIG. 7. As is clear from FIG. 7, the PI signal first appears with a small level when the focal point of the laser beam falls on the surface of the disc 1, and then appears with a large level when the focal point of the laser beam reaches the recording layer embedded in the disc 1. As for CD, a time period from the detection of the small-level PI signal to the detection of the large-level PI signal is longer than that for DVD.

The servo processing DSP 12 thus receives the PI signal from the RF amplifier 5, detects time period from the detection of the small-level PI signal to the detection of the large-level PI signal, determines whether the disc 1 is a CD or DVD based on such detected time period, and sends a determination output to the servo processing microcomputer 14.

When the determination output received from the servo processing DSP 12 expresses that the disc 1 loaded on the video game console is a CD, the servo processing microcomputer 14 directly terminates the reproduction process expressed by the flow chart shown in FIG. 6, and then adjusts gain of the individual amplifiers in the reproduction system to a value suitable for reproducing CD, and advances to operation for reproducing the CD.

On the other hand, when the determination output received from the servo processing DSP 12 expresses that the disc 1 loaded on the video game console is a DVD, the servo processing microcomputer 14 directly transfers the single-layer/multi-layer determination process to step S2 so as to measure the level of the PI signal. Next in step S3, the servo processing DSP 12 adjusts gain of the individual amplifiers in the reproduction system to a value suitable for reproducing DVD depending on the measured level of the PI signal, and advances the reproduction process to step S4.

The servo processing microcomputer 14 determines in step S4 whether the recording layer of the DVD is provided in a single or plural numbers according to a process flow described later, effects in step S5 drawing-in of the focus to thereby effect automatic adjustment of the servo system corresponding to the variety of thus determined DVD, and starts in step S6 reproduction of information stored in the DVD. This ensures reproduction operation corresponding to the number of recording layers of DVD, and the reproduction process expressed by the flow chart shown in FIG. 6 comes to the end.

Single-Layer/Multi-Layer Determination Operation

Figure 9:
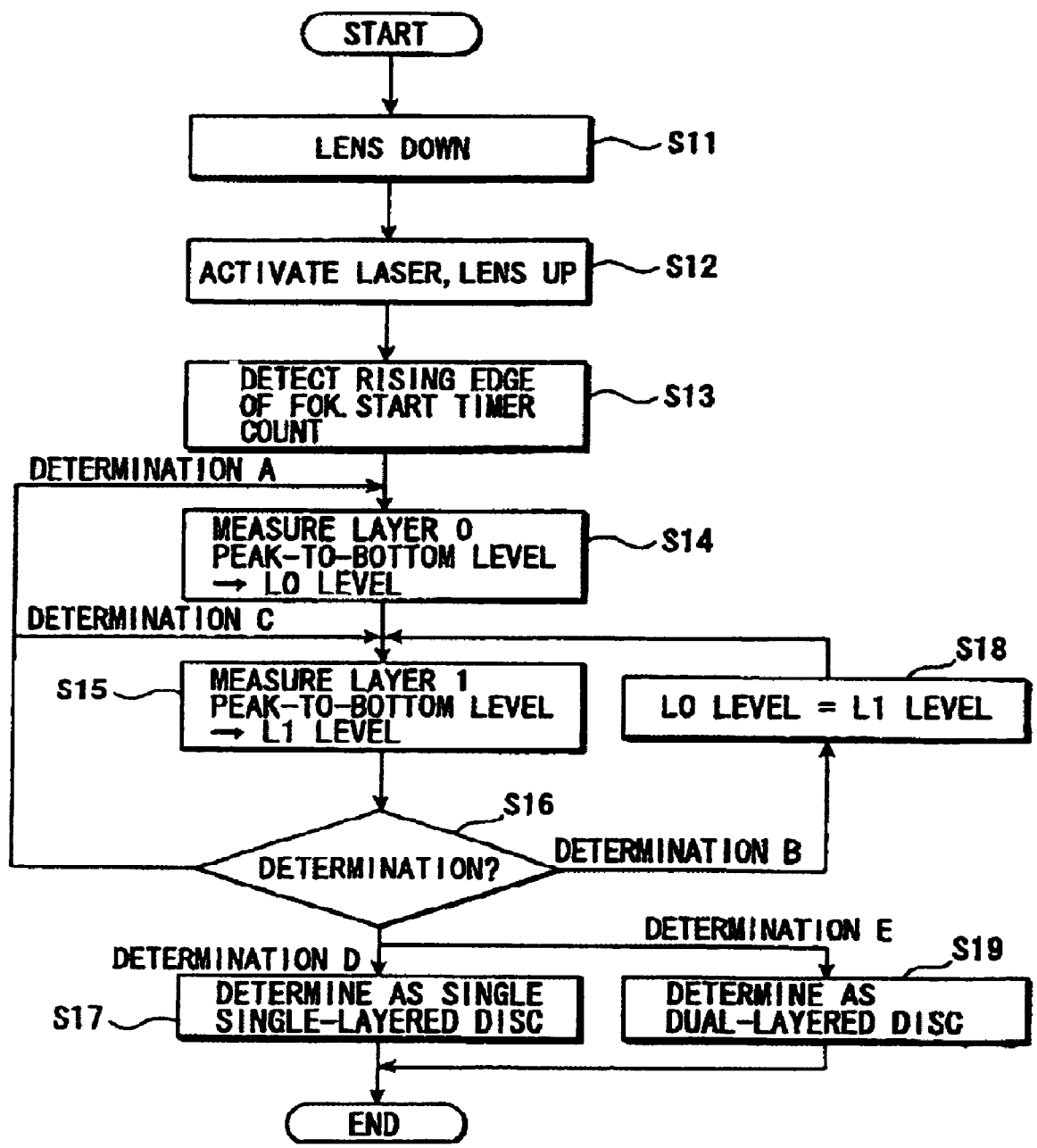
FIG. 9 is a flow chart for explaining single-layer/multi-layer determination process executed on a video game console according to an embodiment.

FIG. 9 is a flow chart showing a process flow of the single-layer/multi-layer determination process for DVD in the foregoing step S4. It should now be noted that an exemplary case explained below relates to determination between a single-layer DVD having one recording layer and a dual-layer DVD having two recording layers.

The flow chart shown in FIG. 9 starts when the gain of the individual amplifiers in the reproduction system of the video game console is set to a value suitable for reproducing DVD, and the single-layer/multi-layer determination process for DVD advances to step S11.

For the case of this video game console, the single-layer/multi-layer determination is to be effected at the inner circumferential portion of the disc 1. It is to be noted that the single-layer/multi-layer determination may be effected at the intermediate portion between the inner circumference and the outer circumference. The servo processing microcomputer 14 thus makes the servo processing DSP 12 and driver 13 move the biaxial actuator 15 under control (lens down) so as to place the objective lens 16 of the optical pick-up 3 at a predetermined position on the inner circumferential side and distant by a predetermined amount from the disc 1 (disc Far position).

Next in step S12, the servo processing microcomputer 14 makes the servo processing DSP 12 and driver 13 light the semiconductor laser of the optical pick-up 3 so as to irradiate under control the laser beam onto the inner circumferential plane of the disc 1, and also makes the biaxial actuator 15 operate under control so as to gradually bring the objective lens 16, which has been placed as being distant by the predetermined amount (disc Far position), to the position (disc Near position) close to the protective film on the disc 1 at a constant velocity. This allows the focal point of the laser beam to gradually approach the recording layer of the disc 1 at a constant velocity.

When the laser beam emitted from the optical pick-up 3 is irradiated on the disc 1, the laser beam is reflected on the disc to thereby produce reflected light. The reflected light is received by a photo-detector provided in the optical pick-up 3, which results in generation of a focus error signal (FE signal: typically generated by astigmatic process); and a disc reflection signal (PI signal) depending on the amount of received light and receiving conditions.

Among these, the focus error signal is fed to the peak bottom detector 6, FcmpH comparator 7 and FcmpL comparator 9. The PI signal is fed to the peak detector 9 and FOK comparator 10.

Figure 8:
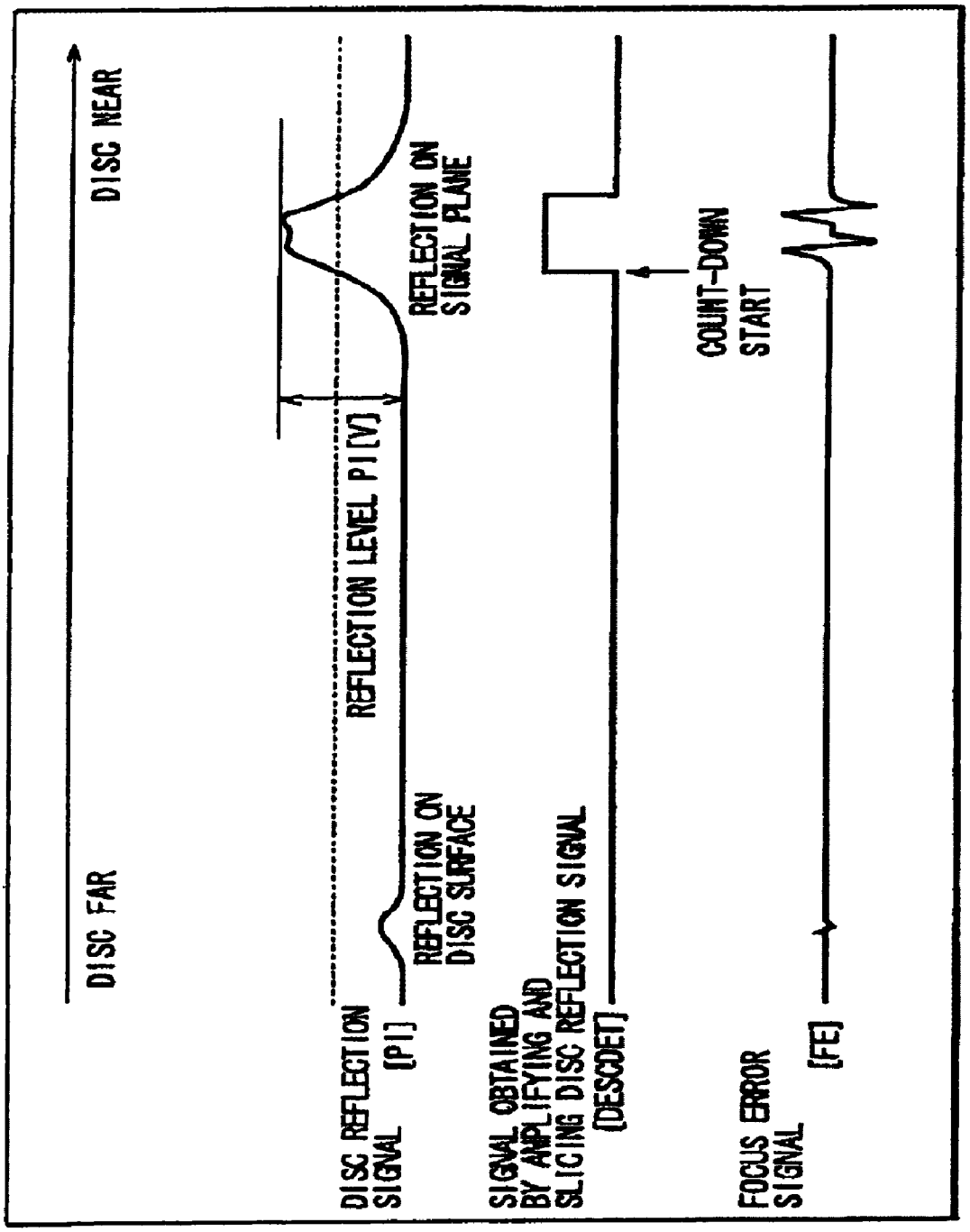
FIG. 8 is a chart showing reproduction outputs ascribable to disc surface and recording layer of a dual-layer disc

FIG. 7 shows a PI signal for a single-layer DVD, and FIG. 8 shows a PI signal for a dual-layer DVD, where a threshold value is respectively set for the PI signals in both charts as indicated by dotted line in order to effect binary coding of the PI signal corresponded to the recording layer (i.e., PI signal corresponded to reflection on the signal plane).

The servo processing microcomputer 14 sets this threshold value in relation to the FOK comparator 10. The FOK comparator 10 carries out binary coding of the PI signal corresponded to the recording layer based on such threshold value, to thereby generate a FOK signal which keeps the level thereof high during a time period the focal point of the laser beam moves across the recording layer as shown in FIGS. 7 and 8, and then send the signal to the servo processing microcomputer 14.

In step S13, the servo processing microcomputer 14 detects a rising edge of the FOK signal, and starts, in synchronization with the rising, count-down of the time set on a timer 18 shown in FIG. 5, where count-up is also allowable, and counting of the number of clock signals at a predetermined frequency in place of time is still also allowable. The single-layer/multi-layer determination process then advances to step S14.

As is clear from comparison between the focus error signals shown in FIGS. 7 and 8, the disc 1 generally gives one cycle of focus error signal within a time period during which the FOK signal is kept at a high level for the case the disc 1 is of single-layer, and two cycles of focus error signal within such time period for the case the disc 1 is of dual-layer. While it may be sufficient to set the time period, during which the FOK signal is kept at a high level as shown in FIGS. 7 and 8, on the timer 18 as a count-down time, the video game console herein is designed to set on the timer 18 a longer time period comprising the foregoing time period for essentially ensuring the high-level of the FOK signal and an additional time period.

Such longer time setting can successfully suppress influence caused by variation in moving speed of the objective lens 16 possibly occurs in the individual devices.

In the next step of the single-layer/multi-layer determination process, the focal point of the laser beam is moved under control from the disc Far position to the disc Near position at a constant velocity as described In the above. Such control of focal movement allows the focal point of the laser beam to move from a first recording layer (Layer0) to a second recording layer (Layer1) in this order, so that focus error signals with large amplitudes will appear each time the focal point of the laser beam moves to the individual recording layers.

In step S14, the servo processing microcomputer 14 detects a peak-to-bottom level difference of the focus error signal obtained when the focal point of the laser beam moves to the first recording layer (Layer0).

Figure 10:
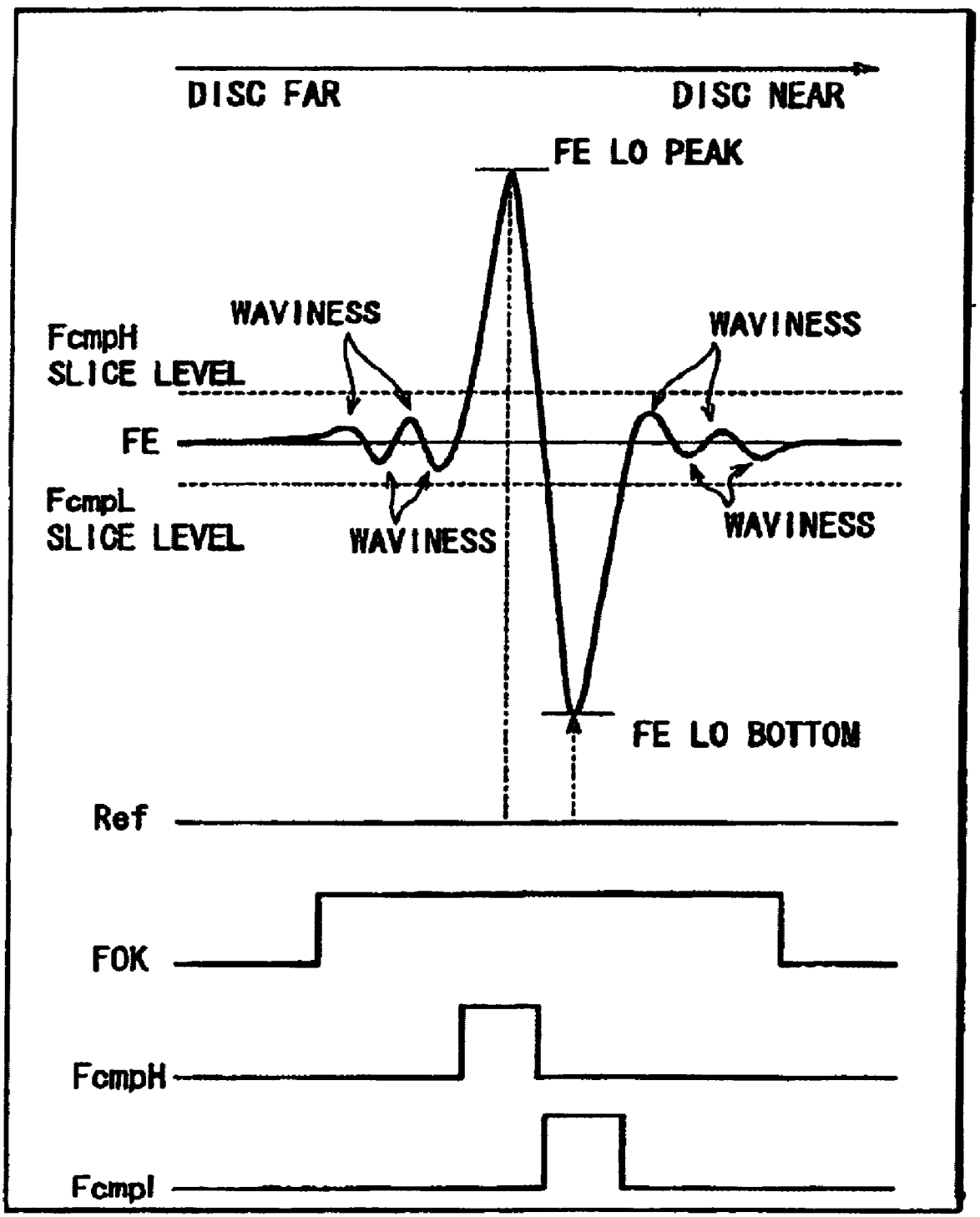
FIG. 10 is a chart showing wave form of a focus error signal almost free from waviness component obtained from a single-layer disc.
Figure 11:
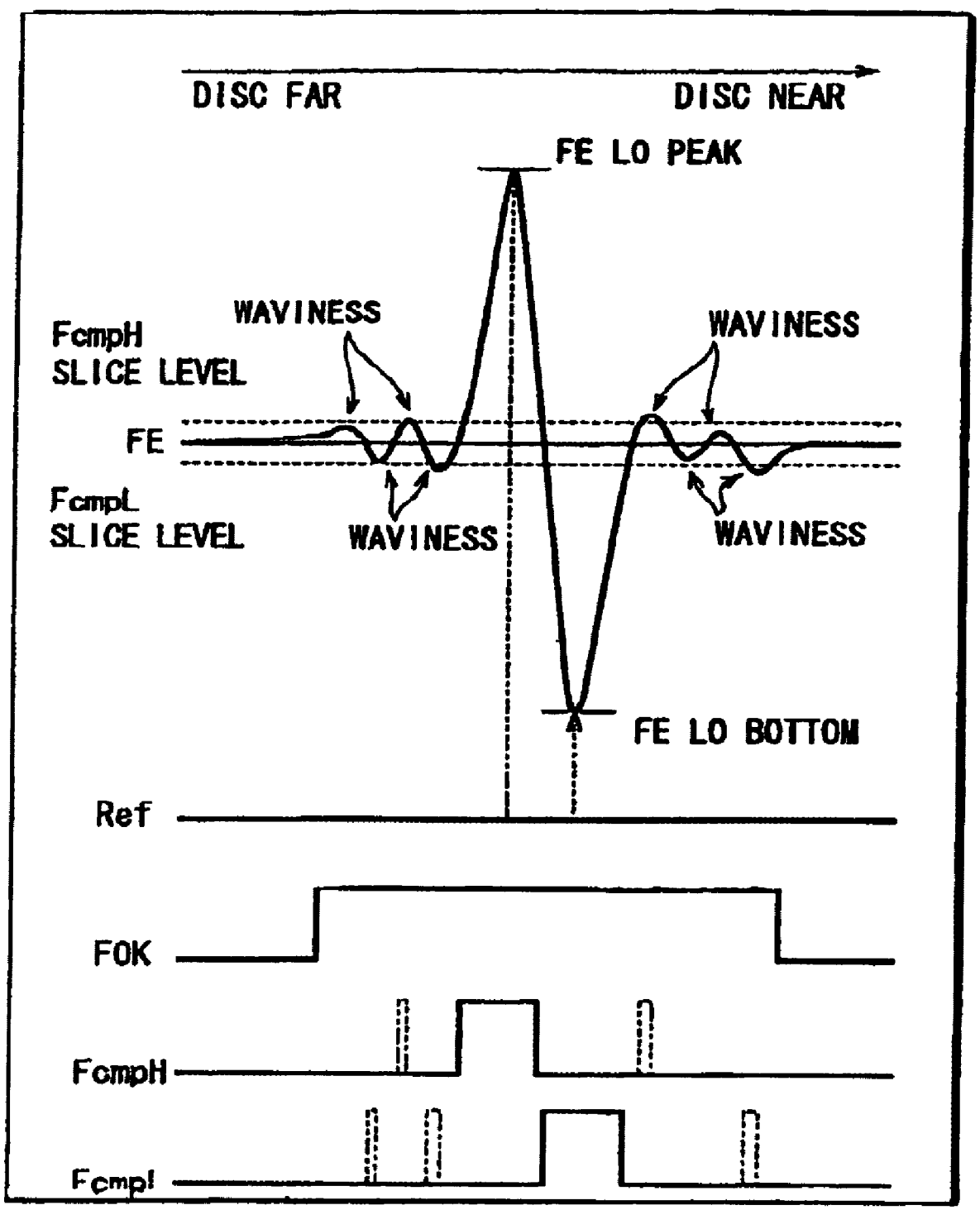
FIG. 11 is a chart showing waveform of a focus error signal with some waviness component obtained from a single-layer disc.
Figure 12:
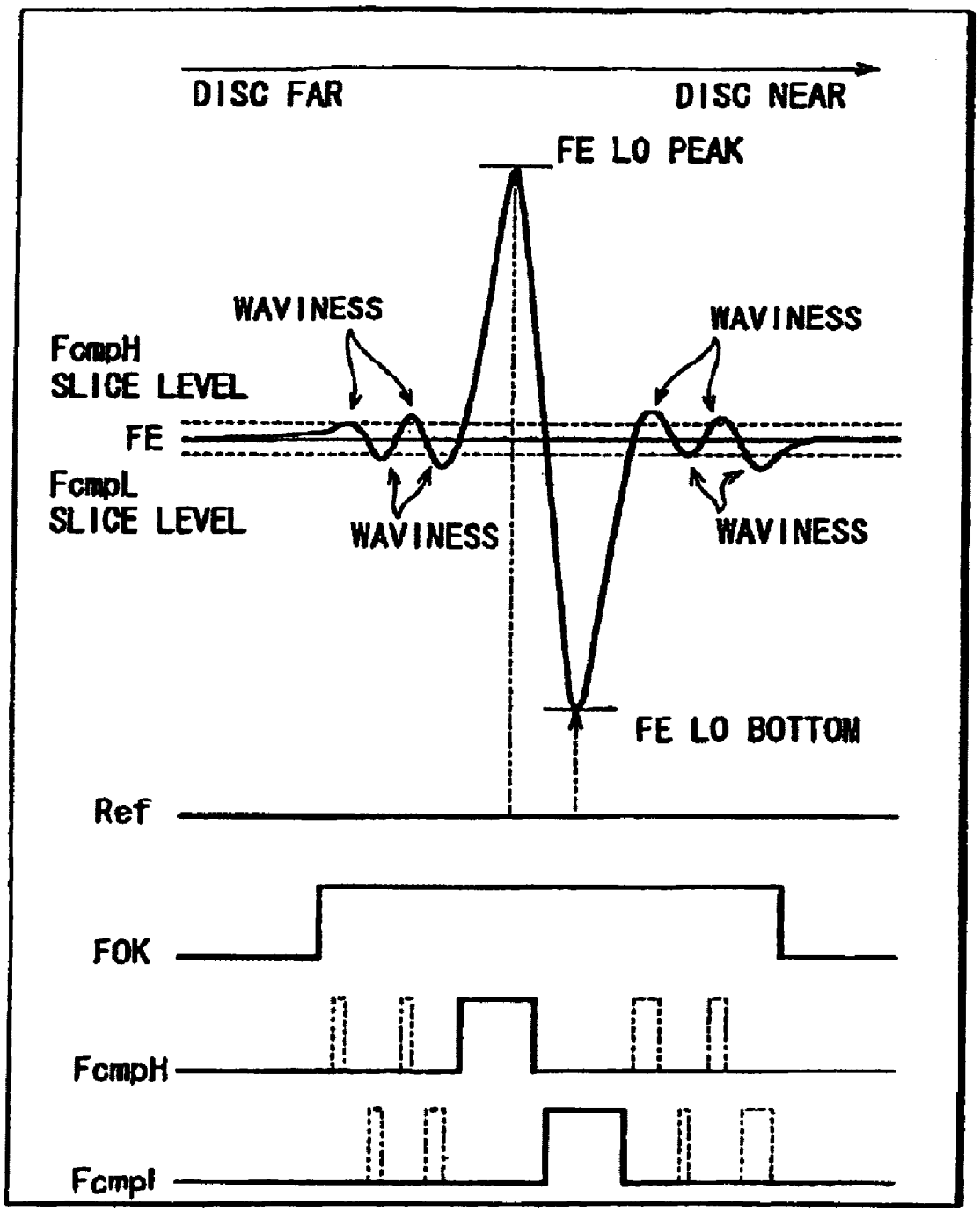
FIG. 12 is a chart showing waveform of a focus error signal with large waviness component obtained from a single-layer disc.

FIGS. 10 to 12 are the waveform charts individually showing the focus error signal obtained when the focal point of the laser beam moves to the recording layer of a single-layer DVD, the foregoing FOK signal, the FcmpH signal kept at a high level over a period during which the level of the focus error signal is higher than the high-level threshold value (FcmpH slice level) set for such focus error signal, and the FcmpL signal kept at a high level over a period during which the level of the focus error signal becomes lower than the low-level threshold value (FcmpL slice level) set for such focus error signal.

Among these, FIG. 10 is an exemplary waveform chart showing that the levels of the waviness appearing immediately before and after the main focus error signal fall within a range from the low-level threshold value and the high-level threshold value. In this case, fake pulse due to waviness (see pulses indicated by dotted line in FIGS. 11 and 12) is not generated relative to the FcmpH signal and the FcmpL signal.

FIGS. 11 and 12 are the waveform charts showing that the levels of the waviness appearing immediately before and after the focus error signal is higher than the high-level threshold value and becomes lower than the low-level threshold value, where FIG. 12 shows a larger level of the waviness component than that in FIG. 11.

In these cases, the FcmpH signal is kept at a high level over a period during which the level of the main focus error signal is higher than the high-level threshold value, and the FcmpL signal is kept at a high level over a period during which the level of the main focus error signal becomes lower than the low-level threshold value In addition, high-level fake pulses appear in association with the FcmpH signal over a period when the level of the waviness component in higher than the high-level threshold value, and high-level fake pulses appear in association with the FcmpL signal over a period when the level of the waviness component becomes lower than the low-level threshold value, as indicated by the dotted line in FIGS. 11 and 12.

Figure 13:
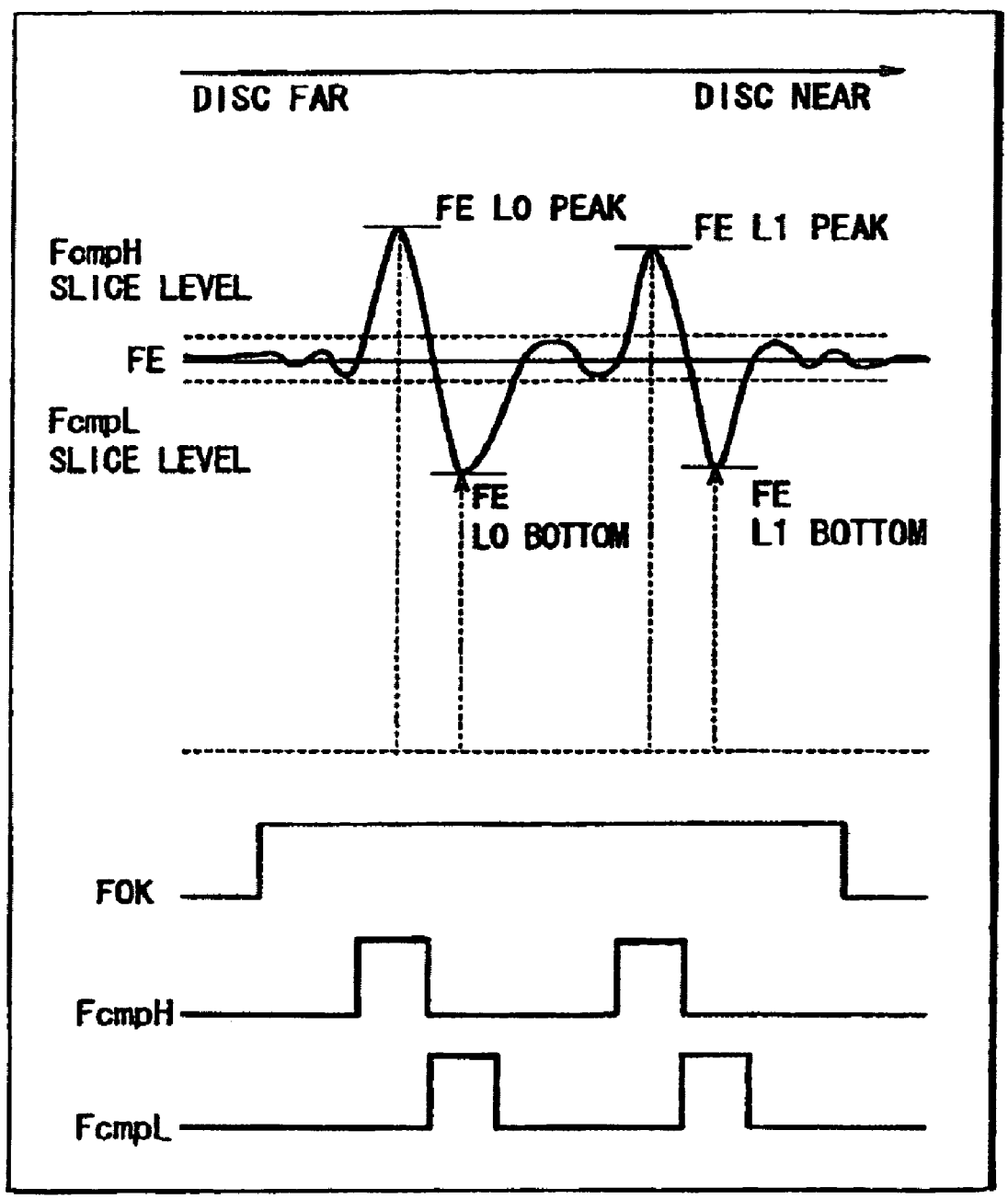
FIG. 13 is a chart showing waveform of a focus error signal almost free from waviness component obtained from a dual-layer disc.
Figure 14:
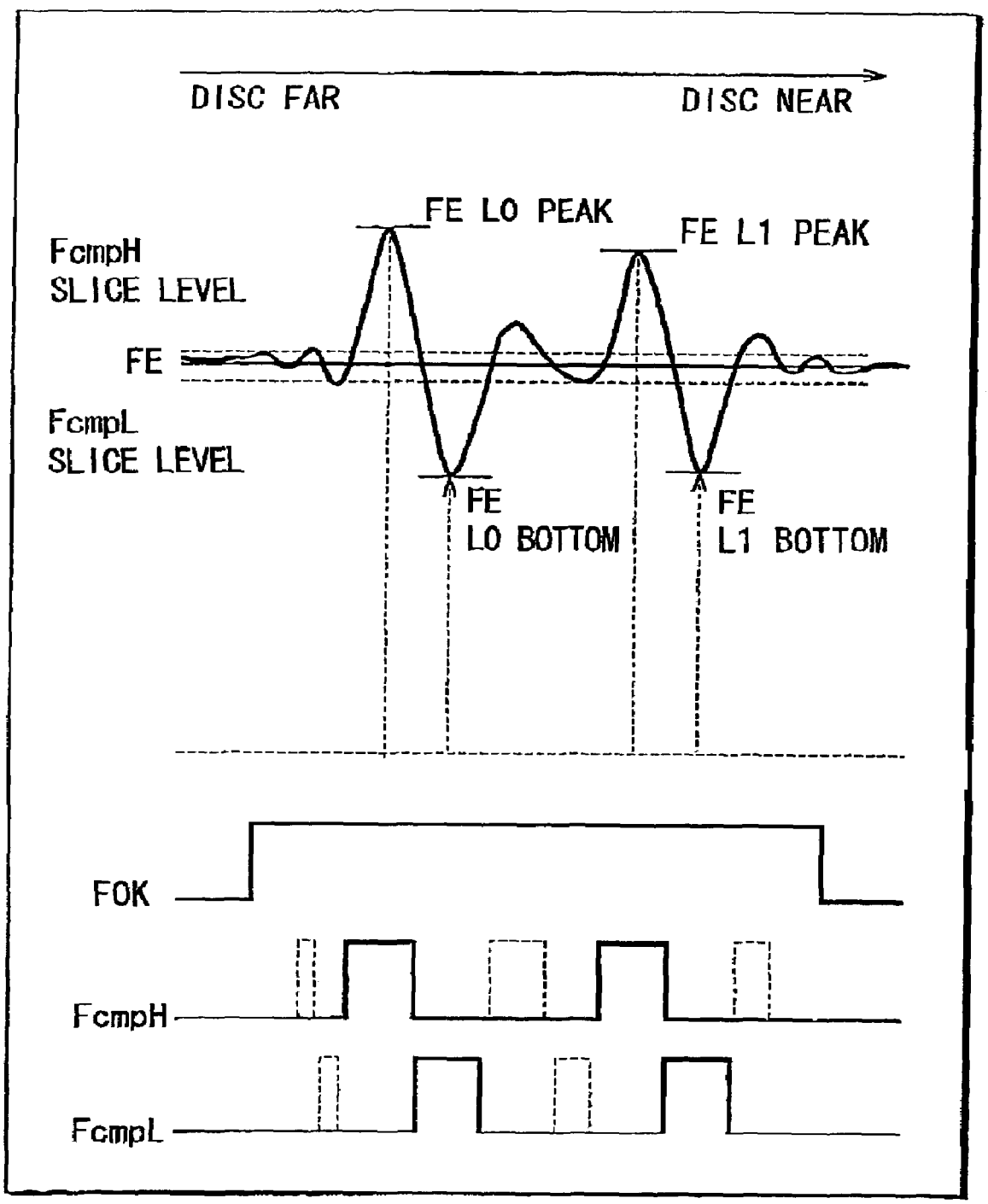
FIG. 14 is a chart showing waveform of a focus error signal with some waviness component obtained from a dual-layer disc.
Figure 15:
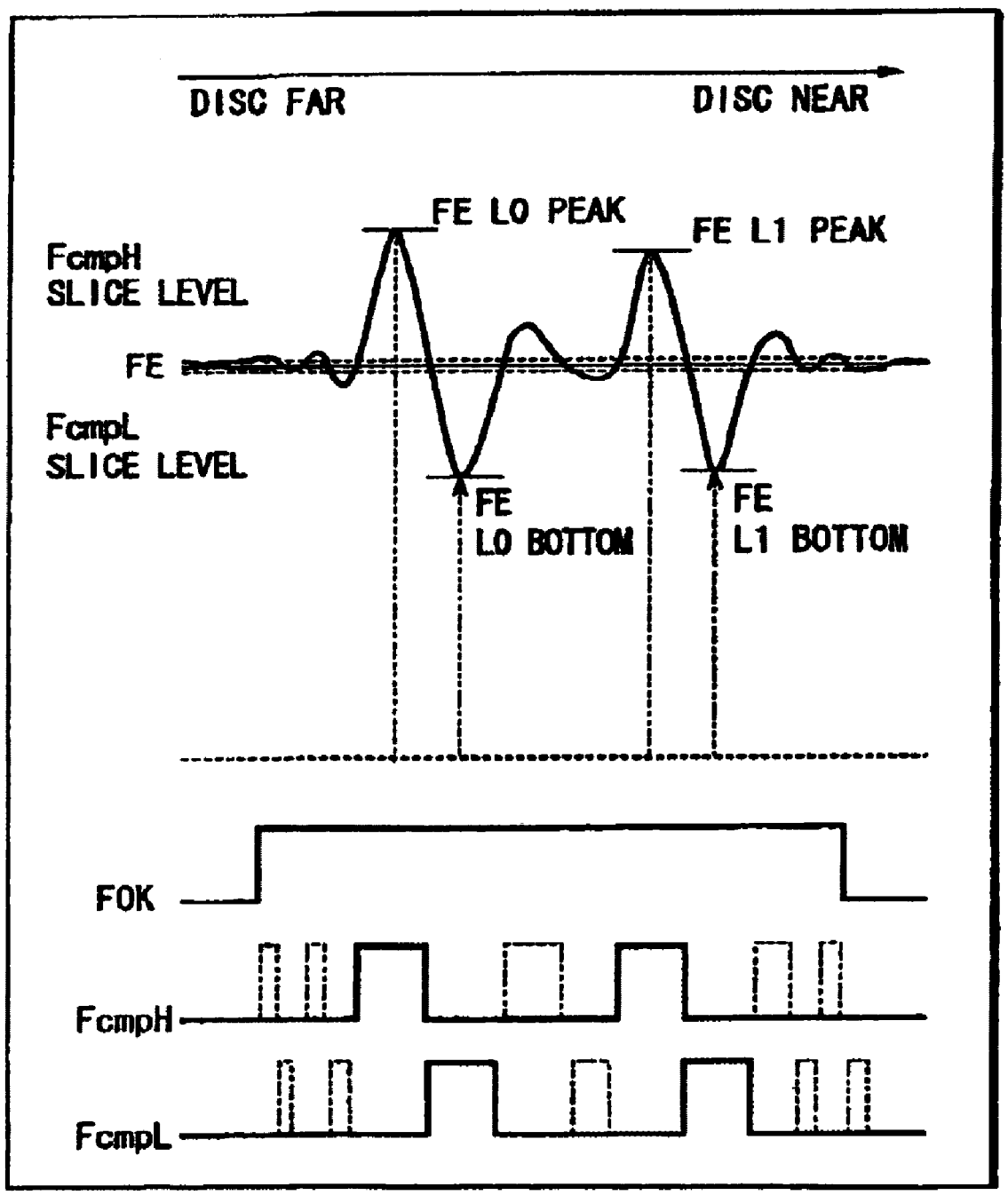
FIG. 15 is a chart showing waveform of a focus error signal with large waviness component obtained from a dual-layer disc.

Similarly, FIGS. 13 to 15 are the waveform charts individually showing the focus error signal obtained when the focal point of the laser beam moves to the recording layer of a dual-layer DVD, the foregoing FOK signal, the FcmpH signal kept at a high level over a period during which the level of the focus error signal is higher than the high-level threshold value (FcmpH slice level) set for such focus error signal, and the FcmpL signal kept at a high level over a period during which the level of the focus error signal becomes lower than the low-level threshold value (FcmpL slice level) set for such focus error signal.

Among these, FIG. 13 is an exemplary waveform chart showing that the levels of the waviness appearing immediately before and after the main focus error signal fall within a range from the low-level threshold value and the high-level threshold value. In this case, fake pulse due to waviness (see pulses indicated by dotted line in FIGS. 14 and 15) is not generated relative to the FcmpH signal and FcmpL.

FIGS. 14 and 15 are the waveform charts showing that the levels of the waviness appearing immediately before and after the focus error signal becomes higher the high-level threshold value and the low-level threshold value, where FIG. 15 shows a larger level of the waviness than that in FIG. 14.

In this case, the FcmpH signal is kept at a high level over a period during which the level of the main focus error signal exceeds the high-level threshold value, and the FcmpL signal is kept at a high level over a period during which the level of the main focus error signal becomes lower than the low-level threshold value. In addition, high-level fake pulses appear in association with the FcmpH signal over a period when the level of the waviness component exceeds the high-level threshold value, and high-level fake pulses appear in association with the FcmpL signal over a period when the level of the waviness component becomes lower than the low-level threshold value, as indicated by the dotted line in FIGS. 14 and 15.

The servo processing microcomputer 14 sets the high-level threshold value (FcmpH Slice Level) for the FcmpH comparator 7 shown in FIG. 5, and sets the low-level threshold value (FcmpL Slice Level) for the FcmpL comparator 8.

The FcmpH comparator 7 generates the FcmpL signal which is kept at a high level over a period during which the level of the focus error signal fed from the RF amplifier 5 is higher the high-level threshold value (FcmpH Slice Level), and then sends it to the servo processing microcomputer 14.

The FcmpL comparator 8 generates the FcmpL signal which is kept at a high level over a period during which the level of the focus error signal fed from the RF amplifier 5 is lower than the low-level threshold value (FcmpL Slice Level), and then sends it to the servo processing microcomputer 14.

The peak bottom detector 6 is supplied with, through the servo processing microcomputer 14, the FcmpH signal and FcmpL signal detected by the comparator 7 and 8, respectively. The peak bottom detector 6 detects a value of the focus error signal which grows highest during a period from the rising edge and falling edge of the FcmpH signal, and supplies such signal value as a peak value of the focus error signal to the servo processing microcomputer 14. The servo processing microcomputer 14 stores this peak value as a peak value (L0 peak) for the first recording layer.

The peak bottom detector 6 also detects a value of the focus error signal which grows lowest during a period from the rising edge and falling edge of the FcmpL signal, and supplies such signal value as a bottom value of the focus error signal to the servo processing microcomputer 14. The servo processing microcomputer 14 stores this bottom value as a bottom value (L0 bottom) for the first recording layer.

Based on such peak value (L0 peak) and bottom value (L0 bottom), the servo processing microcomputer 14 then detects a peak-to-bottom level (L0 Level) of the focus error signal obtained when the focus of the laser beam lands on the first recording layer (Layer0). This is all about the operation in step S14.

If the rising edge of the FcmpH signal cannot be detected in the stage of detection of such L0 Level despite the count-down by the timer 18, which started when the rising edge of the FOK signal was detected, came to "0", the servo processing microcomputer 14 makes a determination that a disc not available on the video game console (invalid disc) was loaded, and typically displays an error message for the user.

Next in step S15, the peak bottom detector 6 supplies a value of the focus error signal which was determined as having a highest value during a period from the rising edge to the falling edge of another FcmpH signal next to the foregoing FcmpH signal which has previously been used for detecting L0 Level, as a peak value of such focus error signal to the servo processing microcomputer 14. The servo processing microcomputer 14 stores this peak value as a peak value (L1 peak) of the second recording layer.

The peak bottom detector 6 supplies a value of the focus error signal which was determined as having a lowest value during a period from the rising edge to the falling edge of another FcmpL signal next to the foregoing FcmpL signal which has previously been used for detecting L0 Level, as a bottom value of such focus error signal to the servo processing microcomputer 14. The servo processing microcomputer 14 stores this bottom value as a bottom value (L1 bottom) of the second recording layer.

Based on such peak value (L1 peak) and bottom value (L1 bottom), the servo processing microcomputer 14 then detects a peak-to-bottom level (L1 Level) of the focus error signal obtained when the focus of the laser beam lands on the second recording layer (Layer1).

Next in step S16, the servo processing microcomputer 14 makes determination as explained below based on L0 Level, L1 Level, a predetermined constant K, Min Level (minimum level) that expresses a level as small as being not realistic as a focus error signal corresponded to the recording layer, and a count value of the timer 18.

The predetermined constant K herein is determined based on standard reflectivity of the individual recording layers according to a certain disc format, level of the waviness component contained in the focus error signal and so forth.

More specifically in this exemplary case, the ratio of a peak-to-bottom level of the focus error signal for the first recording layer ranging from the peak (L0 peak and L1 peak) to the bottom (L0 bottom and L1 bottom) to a peak-to-bottom level of the focus error signal for the second recording layer ranging from the peak (L0 peak and L1 peak) to the bottom (L0 bottom and L1 bottom) is assumed as 1:3 at most or below. It is also programmed that a signal having a level equal to or less than ⅓ (approx. 33%) of the focus error signal corresponded to the recording layer is determined, if occurred, as a waviness component. The "predetermined constant K" is thus set as "K=3" (or "K=3 to 5").

Figure 1:
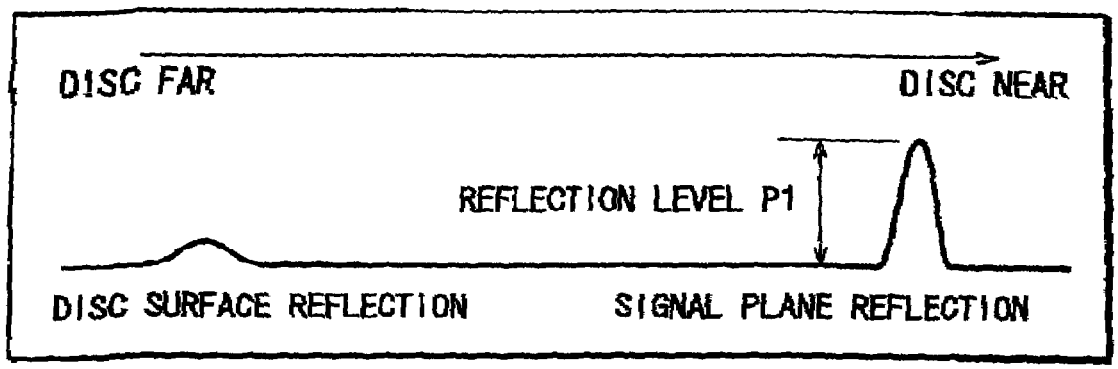
FIG. 1 is a chart for explaining signal level of an RF signal obtained from a single-layer DVD.
Figure 2:
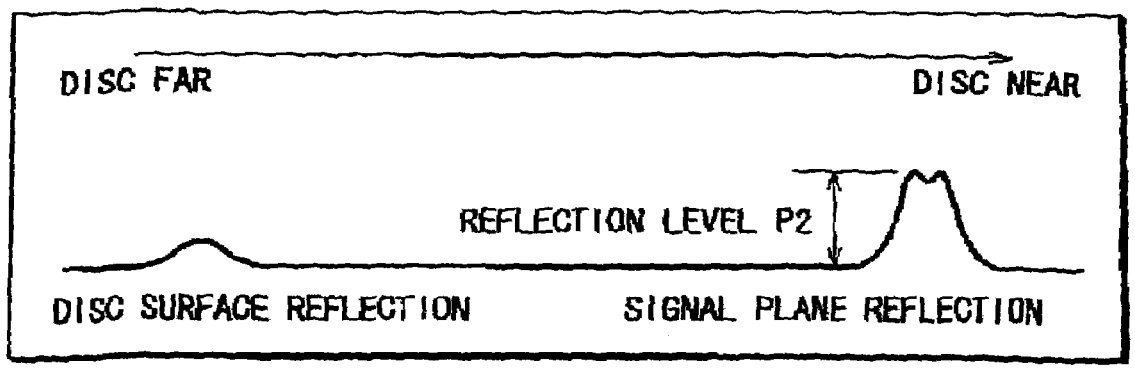
FIG. 2 is a chart for explaining signal level of an RF signal obtained from a dual-layer DVD.
Figure 3:
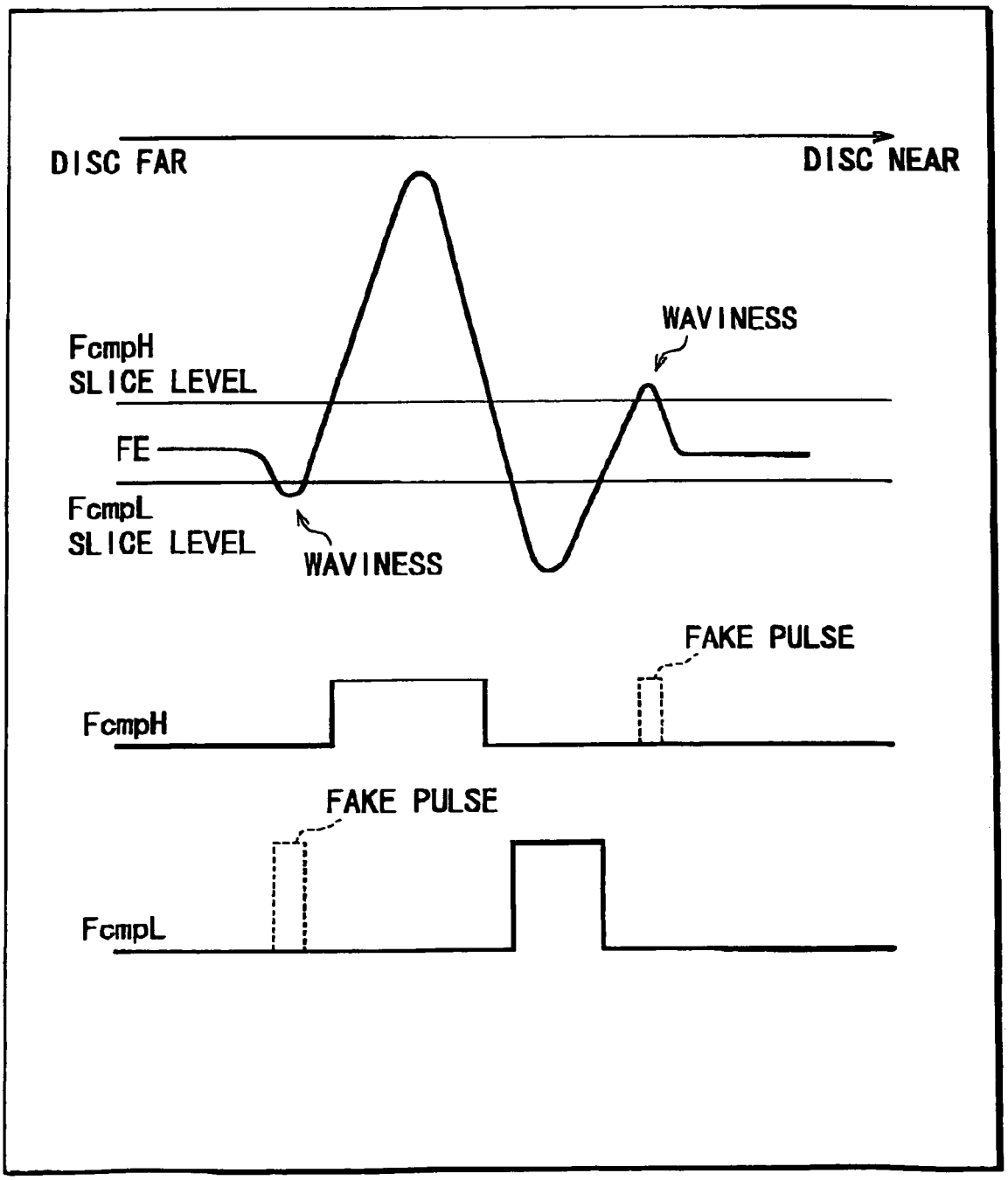
FIG. 3 is a chart showing take pulse generated due to waviness in a focus error signal obtained from a single-layer DVD.
Figure 4:
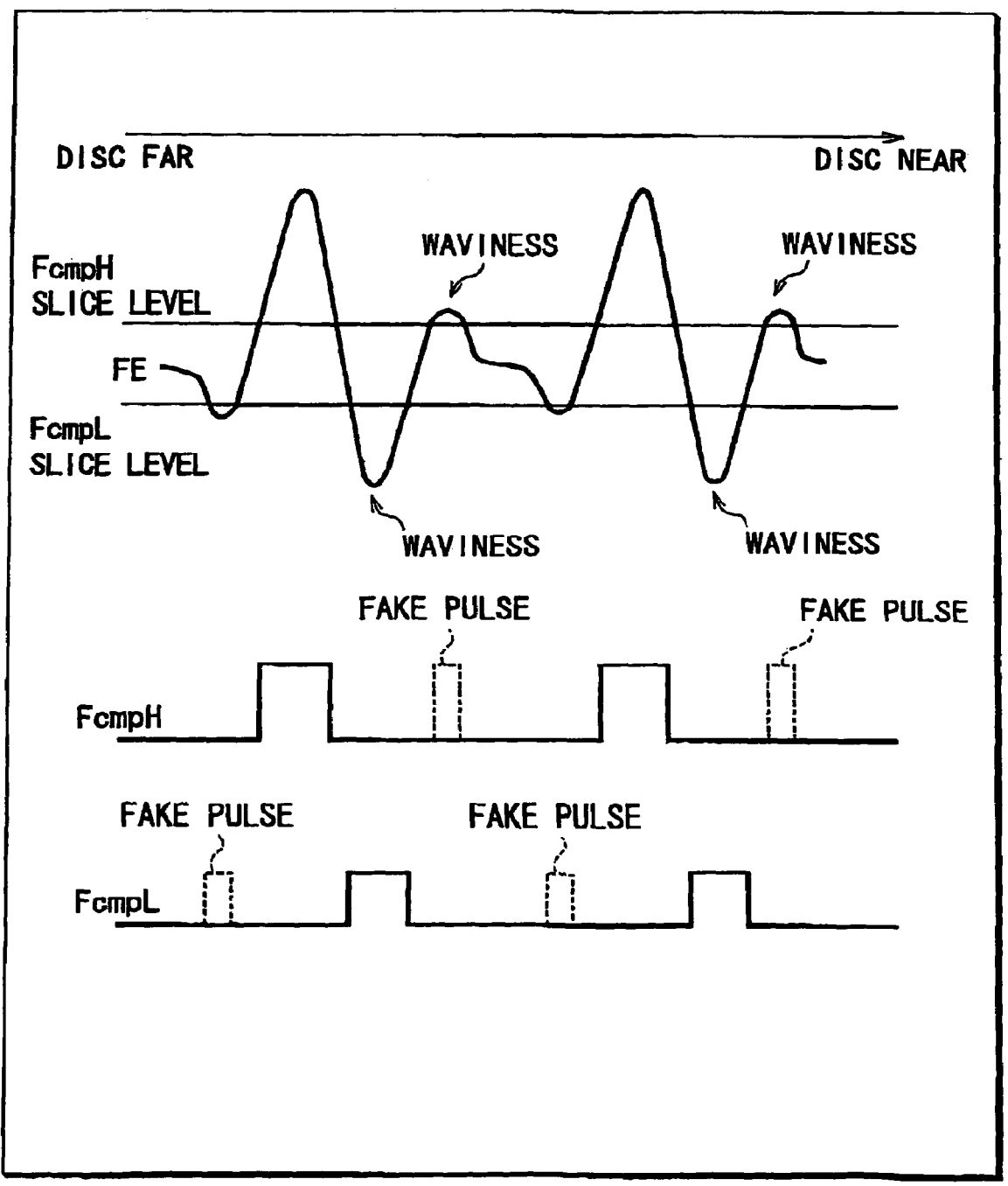
FIG. 4 is a chart showing fake pulse generated due to waviness in a focus error signal obtained from a dual-layer DVD.

FIG. 1 shows a list of criteria for determination made by the servo processing microcomputer 14.

1. Determination "A"

As shown in FIG. 16, when a peak-to-bottom level (L0 Level) of the focus error signal obtained upon landing of the laser beam as being focused on the first recording layer (Layer0) and a peak-to-bottom level (L1 Level) of the focus error signal obtained upon landing of the laser beam as being focused on the second recording layer (Layer1) are lower than the Min Level (minimum level) which expresses a level as small as being not realistic as a focus error signal corresponded to the recording layer, the servo processing microcomputer 14 issues determination "A" according to which both signals of L0 Level and L1 Level represent waviness components.

This refers to a case, as shown in FIGS. 12 and 15, in which fake pulses indicated by the dotted line appear twice in succession in the former stage of the FcmpH signal and FcmpL signal corresponded to the main focus error signal.

Since the FcmpH and FcmpL signals corresponded to the main focus error signal are assumed as not being detected yet in this case, the servo processing microcomputer 14 then makes, as shown in the flow chart in FIG. 9, the single-layer/multi-layer determination process return from step S16 to step S14, from where another process for detecting L0 Level and L1 Level starts again.

This successfully discards the fake pulses associated with the FcmpH and FcmpL signals, and re-starts the operation for detecting true FcmpH and FcmpL signals.

2. Determination "B"

When a ratio (L1 Level/L0 Level) obtained by dividing L1 Level corresponded to the second recording layer by L0 Level corresponded to the first recording layer is larger than the constant K, and also when L1 Level is larger than Min Level, the servo processing microcomputer 14 issues determination "B" according to which L0 Level represents a waviness component.

L1 Level larger than Min Level means that such L1 Level corresponds to the main focus error signal. And the fact that the ratio obtained by dividing such L1 Level corresponded to the main focus error signal by L0 Level corresponded to the first recording layer is larger than the constant K means that L0 Level is a very small value far from being supposed as the main focus error signal.

This refers to a case, as shown in FIGS. 11 and 14, in which take pulses indicated by the dotted line appear once in the former stage of the FcmpH signal and FcmpL signal corresponded to the main focus error signal.

Since L0 Level corresponded to the first recording layer, which was the first value to be detected, is detected based on the fake pulse, and since L1 Level corresponded to the second recording layer, which was detected next, is true L0 Level corresponded to the first recording layer, the servo processing microcomputer 14 then makes, as shown in the flow chart in FIG. 9, the single-layer/multi-layer determination process advance from step S16 to step S18.

In step S18, the servo processing microcomputer 14 discards L0 Level corresponded to the first recording layer, which was the first value to be detected, and then stores L1 Level corresponded to the second recording layer, which was detected next, as L0 Level corresponded to the first recording layer. The single-layer/multi-layer determination process advances to step S15 to thereby make a second trial of L1 Level detection.

This successfully discards the fake pulses associated with the FcmpH and FcmpL signals, and re-starts the operation for detecting the true FcmpH and FcmpL signals.

3. Determination "C"

Next case relates to that a ratio (L0 Level/L1 Level) obtained by dividing L0 Level corresponded to the first recording layer by L1 Level corresponded to the second recording layer is larger than the constant K, and that L0 Level is larger than Min Level, and further that the countdown by the timer 18 is still in progress (i.e., within the counting period). The servo processing microcomputer 14 in this case issues determination "C" according to which such L1 Level represents a waviness component.

L0 Level larger than Min Level means that such L0 Level has a value corresponds to the main focus error signal. The fact that the ratio obtained by dividing such L0 Level corresponded to the main focus error signal by L1 Level corresponded to the second recording layer is larger than the constant K means that L1 Level is a very small value far from being supposed as the main focus error signal. Moreover the fact that the count-down is still in progress despite L1 Level is detected means that such L1 Level corresponds to the fake pulse and that true L1 Level has not been detected yet.

Thus the servo processing microcomputer 14 issues determination "C" according to which the single-layer/multi-layer determination process goes from step S16 back to step S15 to thereby make a second trial of L1 Level detection.

This successfully discards the fake pulses associated with the FcmpH and FcmpL signals, and re-starts the operation for detecting true FcmpH and FcmpL signals 4. Determination "D"

Next case relates to that the count-down by the timer 18 completed (measurement period expired) before the L1 Level corresponded to the second recording layer is detected, and that L0 Level corresponded to the first recording layer is larger than Min Level. This means that the second recording layer is not found on the disc 1, and that already-detected L0 Level corresponded to the first recording layer has a value which corresponds to the main focus error signal. This refers to a case in which no fake pulse is found, and one each of FcmpH signal and FcmpL signal for the focus error signal are detected as shown in FIG. 10.

The servo processing microcomputer 14 thus issues determination "D" according to which the single-layer/multi-layer determination process advances from step S16 to step S17 as shown in the flow chart in FIG. 9, and in which step S17, the disc 1 currently loaded on the video game console is determined as a single-layer DVD (single-layer disc), and the single-layer/multi-layer determination process shown in the flow chart in FIG. 9 comes to the end. This ensures a correct determination of a single-layer DVD having only one recording layer.

The DVD having one recording layer on each sided is a multi-layer storage medium, as two recording layer exists for the whole disc. However, as only one recording layer exists for one sided, the DVD having one recording layer on each sided is determined as a single-layer DVD in determination process "D".

5. Determination "E"

The next case relates to that a ratio (L1 Level/L0 Level) obtained by dividing L1 Level corresponded to the second recording layer by L0 Level corresponded to the first recording layer is smaller than the constant K, and that both of L0 Level and L1 Level are larger than Min Level. This means that L0 Level and L1 Level have a similar level, and that both of L0 Level and L1 Level correspond with the main focus error signal since both of them are larger than Min Level.

This refers to a case in which no fake pulse is found, and two each of FcmpH signals and FcmpL signals for the focus error signal are detected as shown in FIG. 15.

The servo processing microcomputer 14 thus issues determination "E" according to which the single-layer/multi-layer determination process advances from step S16 to step 319 as shown in the flow chart in FIG. 9, and in which step S19, the disc 1 currently loaded on the video game console is determined as a dual-layer DVD (dual-layer disc) having two recording layers, and the single-layer/multi-layer determination process shown in the flow chart in FIG. 9 comes to the end. This ensures a correct determination of a dual-layer DVD having two recording layers.

As is clearly known from the above description, the video game console of this embodiment determines whether the recording layer of the disc 1 is of single-layer or multi-layer based on a relative ratio of reproduction outputs (focus error signal in this case) obtained from the individual recording layers. This successfully ensures a wide tolerance for the reproduction output level obtained from the disc 1, and allows correct single-layer/multi-layer determination of discs by properly coping with various discs differing in the reflectivity or with temperature-caused or time-dependent fluctuation in reproduction output level.

According to the present embodiment, adjustment of various threshold values and so forth of video game console having the single-layer/multi-layer determination function may be omissible at the time of delivery from the works by virtue or its stability against changes in the reproduction output level.

Since the single-layer/multi-layer determination is based on amplitude of the reproduction output, correct determination of the number of recording layers on the disc will be ensured even when the reproduction output accidentally has unbalanced amplitude between the former half and latter half of one period.

While the foregoing description of the embodiment dealt with the case in which the objective lens 16 of the optical pick-up 3 is moved under control from the Far position towards the Near position at a constant velocity, it is also allowable to move it conversely from the Near position towards the Far position. Since an inverted waveform of the focus error signal is obtained in this case, it is necessary to properly modify the single-layer/multi-layer determination process so that the inverted waveform can correctly be processed.

While the foregoing description of the embodiments dealt with the case in which the present invention is applied to a video game console having a function for reproducing DVD, the present invention is also applicable to other devices such as DVD player device and DVD recording/reproduction device, and is further applicable to any other devices for handling recording medium for which both of single-layer type and multi-layer type are available.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangement may be devised without departing from the spirit and scope of the present invention as defined by the appended claims.

What is claimed is:

1. A device for determining type of recording media, comprising:
    a setting unit that sets a scanning period during which a recording surface of a recording medium is scanned in perpendicular direction relative to the surface, the recording medium having at least one recording layer;
    a detector that detects a reproduction output level based on the amplitude of reproduction output within the scanning period;
    a storage device that stores a first predetermined normal ratio;
    a comparer that divides, when at least a first reproduction output and a second reproduction output are obtained from the recording medium, the second reproduction output level detected based on the second reproduction output by the first reproduction output level detected based on the first reproduction output, compares a result of the division with the first predetermined normal ratio stored in the storage device, and for the case the result of division is larger than the first predetermined normal ratio, then compares the second reproduction output level with a predetermined level;

a counter that counts the number of the reproduction outputs having reproduction output levels higher than the predetermined level, compared by the comparer; and a determination unit that determines the recording medium has recording layers at least in a number same as the number of the reproduction outputs counted by the counter.

2. The device according to claim 1, wherein the reproduction output level is a difference between the peak level and the bottom level of the reproduction output.

3. The device according to claim 1, wherein the reproduction output is a focus error signal.

4. The device according to claim 1, wherein:
the storage device stores a second predetermined normal ratio; and
the comparer divides, when the result of division based on the first and second reproduction output levels is larger than the first predetermined normal ratio and the second reproduction output level is higher than the predetermined level, and when a third reproduction output is obtained from the recording medium, the third reproduction output level detected based on the third reproduction output by the second reproduction output level, compares a result of the division based on the second and third reproduction outputs levels with the second predetermined normal ratio in the storage device, and for the case the result of division based on the second and third reproduction output levels is smaller than the second predetermined normal ratio then compares the third reproduction output level with the predetermined level.

5. The device according to claim 4 wherein:
the first predetermined normal ratio is the second predetermined normal ratio.

6. A method for determining type of recording media, comprising the steps of:
setting a scanning period during which a recording surface of a recording medium is scanned in perpendicular direction relative to the surface, the recording medium having at least one recording layer;
detecting a reproduction output level based on the amplitude of reproduction output within the scanning period;
storing a first predetermined normal ratio;
dividing, when at least a first reproduction output and a second reproduction output are obtained from the recording medium, the second reproduction output level detected based on the second reproduction output by the first reproduction output level detected based on the first reproduction output;
comparing a result of the division with the first predetermined normal ratio stored in the storage device, and for the ease the result of division is larger than the first predetermined normal ratio, then comparing the second reproduction output level with a predetermined level;
counting the number of the reproduction outputs having reproduction output levels higher than the predetermined level; and
determining the recording medium has recording layers at least in a number same as the number of the reproduction outputs counted by the counter.

7. The method according to claim 6, wherein:
the comparing operation further comprises comparing the first reproduction output level with the predetermined level and comparing the second reproduction output level with the predetermined level for the case the result of division is smaller than the predetermined normal ratio; and
the counting operation further comprises counting the number of the reproduction output having reproduction output level higher than the predetermined level for the case the first reproduction output level and the second reproduction output level are higher than the predetermined level.

8. A computer-readable recording medium having recorded therein a program to be executed by a computer for determining type of recording media, wherein the program comprises the steps of:
setting a scanning period during which a recording surface of a recording medium is scanned in perpendicular direction relative to the surface, the recording medium having at least one recording layer;
detecting a reproduction output level based on the amplitude of reproduction output within the scanning period;
storing a first predetermined normal ratio;
dividing, when at least a first reproduction output and a second reproduction output are obtained from the first recording medium, the second reproduction output level detected based on the second reproduction output by the first reproduction output level detected based on the first reproduction output;
comparing a result of the division with the first predetermined normal ratio stored in the storage device, and for the case the result of division is larger than the first predetermined normal ratio, then comparing the second reproduction output level with a predetermined level;
counting the number of the reproduction outputs having reproduction output levels higher than the predetermined level; and
determining the recording medium has recording layers at least in a number same as the number of the reproduction outputs counted by the counter.

9. The computer-readable recording medium according to claim 8, wherein:
the comparing operation further comprises comparing the first reproduction output level with the predetermined level and comparing the second reproduction output level with the predetermined level for the case the result of division is smaller than the predetermined normal ratio; and
the counting operation further comprises counting the number of the reproduction output having reproduction output level higher than the predetermined level for the case the first reproduction output level and the second reproduction output level are higher than the predetermined level.

10. A computer executable program stored on a computer medium that is executed by a computer for determining type of recording media, comprising the steps of:
setting a scanning period during which a recording surface of a recording medium having at least one recording layer is scanned in perpendicular direction relative to the surface;
detecting a reproduction output level sequentially based on the amplitude of reproduction output within the scanned period;
storing one detected reproduction output level as a first layer level in a storage device;
comparing, when the following new reproduction output level is detected, the new reproduction output level with the first layer level;

determining whether the new reproduction output level and the first layer level meet at least a first condition or a second condition;

updating the value of the stored first layer level to the value of the new reproduction output level for the case of the determination that they meet the first condition; and repeating the comparing and the determining for the case of the determination that they meet the first condition or the second condition wherein the first condition is that the result of division of the new reproduction output level by the first layer level is larger than a normal ratio and the new reproduction output level is higher than a predetermined level.

11. A program according to claim 10, further comprising steps of:

determining whether the new reproduction output level and the first layer level meet a third condition; and storing the value of the new reproduction output level as a second layer level in the storage device for the case of the determination that they meet the third condition.

12. A program according to claim 11 wherein:

the third condition is that the result of division of the new reproduction output level by the first layer level is smaller than a normal ratio and the first layer level and the new reproduction output level are higher than a predetermined level.

13. A program according to claim 11 further comprising step of:

determining the recording medium has one recording layer when the first layer level is stored in the storage device and the second layer level is not stored in the storage device; and determining the recording medium has at least two recording layers when the first and second layer levels are stored in the storage device.

14. A program according to claim 10, wherein:

the second condition is that the result of division of the first layer level by the new reproduction output level is larger than a normal ratio and the first layer level is higher than a predetermined level.

* * * * *